United States Patent
Yang

(10) Patent No.: US 8,017,879 B2
(45) Date of Patent: Sep. 13, 2011

(54) CUSTOMIZABLE KEYBOARD

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 325 days.

(21) Appl. No.: 12/468,806

(22) Filed: May 19, 2009

(65) Prior Publication Data

US 2010/0219058 A1  Sep. 2, 2010

(30) Foreign Application Priority Data

Mar. 2, 2009  (CN) .......................... 2009 1 0300634

(51) Int. Cl.
*H01H 9/26* (2006.01)
(52) U.S. Cl. ....................................................... 200/5 A
(58) Field of Classification Search .................. 200/5 A, 200/553, 6 A, 1 R, 5 R, 341–345, 4
See application file for complete search history.

(56) References Cited

U.S. PATENT DOCUMENTS

| 4,567,469 | A | * | 1/1986 | Danish et al. | 341/21 |
| 5,424,516 | A | * | 6/1995 | Emmons | 200/344 |
| 5,847,337 | A | * | 12/1998 | Chen | 200/5 A |
| 7,368,672 | B2 | * | 5/2008 | Yanai et al. | 200/5 A |
| 7,671,284 | B2 | * | 3/2010 | Nourry et al. | 200/5 A |
| 7,671,286 | B2 | * | 3/2010 | Steijner | 200/5 A |

FOREIGN PATENT DOCUMENTS

| CN | 2137006 Y | 6/1993 |
| CN | 1635596 A | 7/2005 |

* cited by examiner

*Primary Examiner* — Edwin A. Leon
(74) *Attorney, Agent, or Firm* — Altis Law Group, Inc.

(57) ABSTRACT

A keyboard includes a panel and a number of input keys. The input keys are assembled on the panel. The panel includes at least one first positive contact, at least one first negative contact and at least one first signal contact disposed on the panel. Each input key of the number of input keys includes a second positive contact, a second negative contact, a second signal contact and a signal transmitter received therein. The second positive contact, the second negative contact and the second signal contact are configured for connecting to the at least one first positive contact, the at least one first negative contact and the at least one first signal contact respectively when the input key is assembled on the panel. The signal transmitter is configured for emitting a signal reflecting the function of the input key when the input key is pressed.

14 Claims, 7 Drawing Sheets

CUSTOMIZABLE KEYBOARD

BACKGROUND

1. Technical Field

The present disclosure relates to input devices and, particularly, to a customizable keyboard.

2. Description of Related Art

Most conventional keyboards follow the qwerty style and cannot be changed. The input keys are fixed to the panel. For regular use these conventional keyboards may be adequate, however, if a user want to play games on his computer using a conventional keyboard, fat fingering may present a problem. Unlike regular typing, a user must input keystrokes depending on the input to the game being played. Therefore, during game playing and the speed of the reaction time of the user it is easy to press a non-active key by mistake.

What is needed, therefore, is a customizable keyboard, to overcome the above-described problems.

BRIEF DESCRIPTION OF THE DRAWINGS

Many aspects of the present keyboard can be better understood with references to the accompanying drawings. The components in the drawings are not necessarily drawn to scale, the emphasis instead being placed upon clearly illustrating the principles of the present keyboard.

DETAILED DESCRIPTION

Embodiments of the present disclosure will now be described in detail below, with references to the accompanying drawings.

Figure 1:
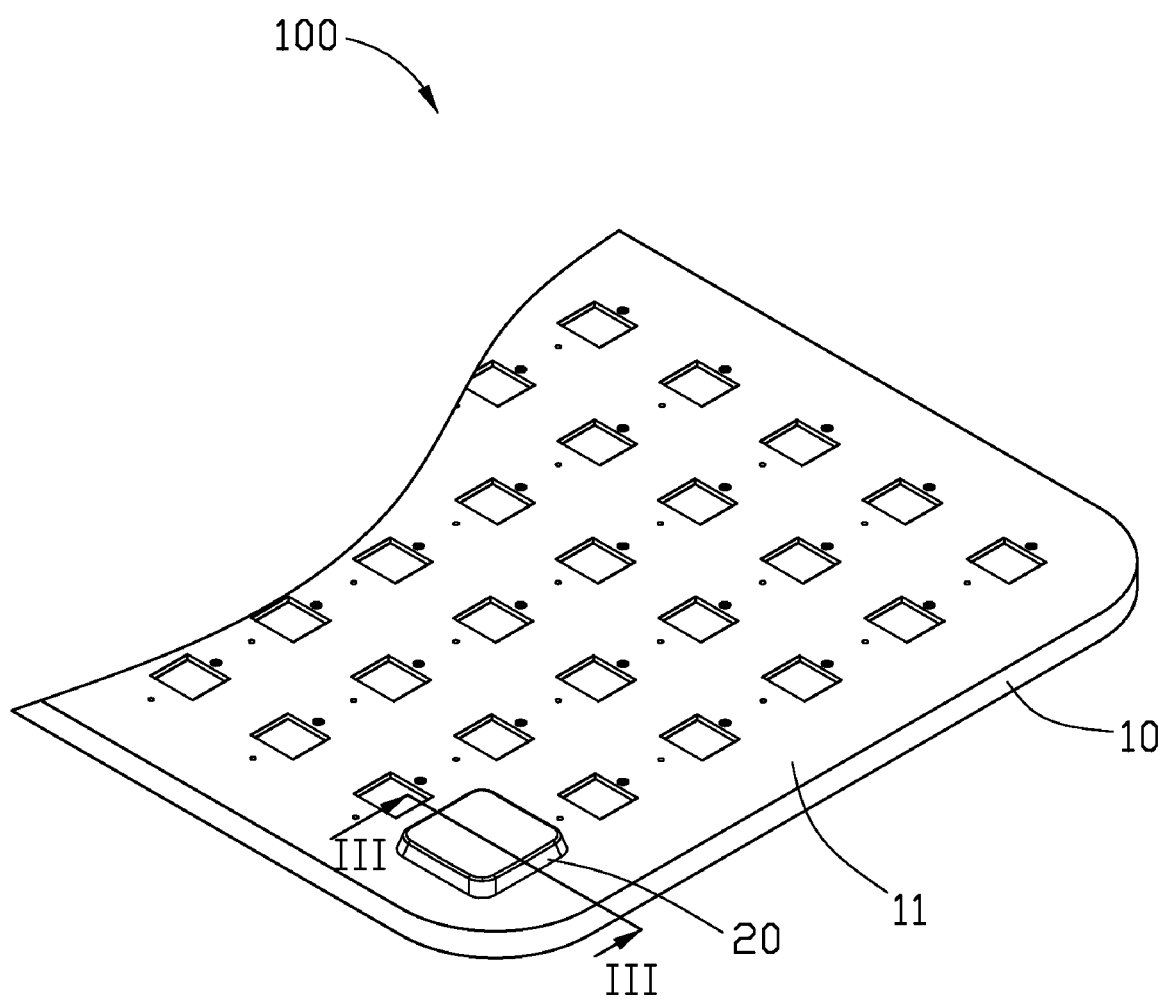
FIG. 1 is an isometric view of a keyboard according to a first exemplary embodiment.

Referring to FIG. 1, a keyboard 100 according to a first exemplary embodiment is shown. The keyboard 100 includes a panel 10 and a number of input keys 20. The input keys 20 are assembled on a surface 11 of the panel 10.

Figure 2:
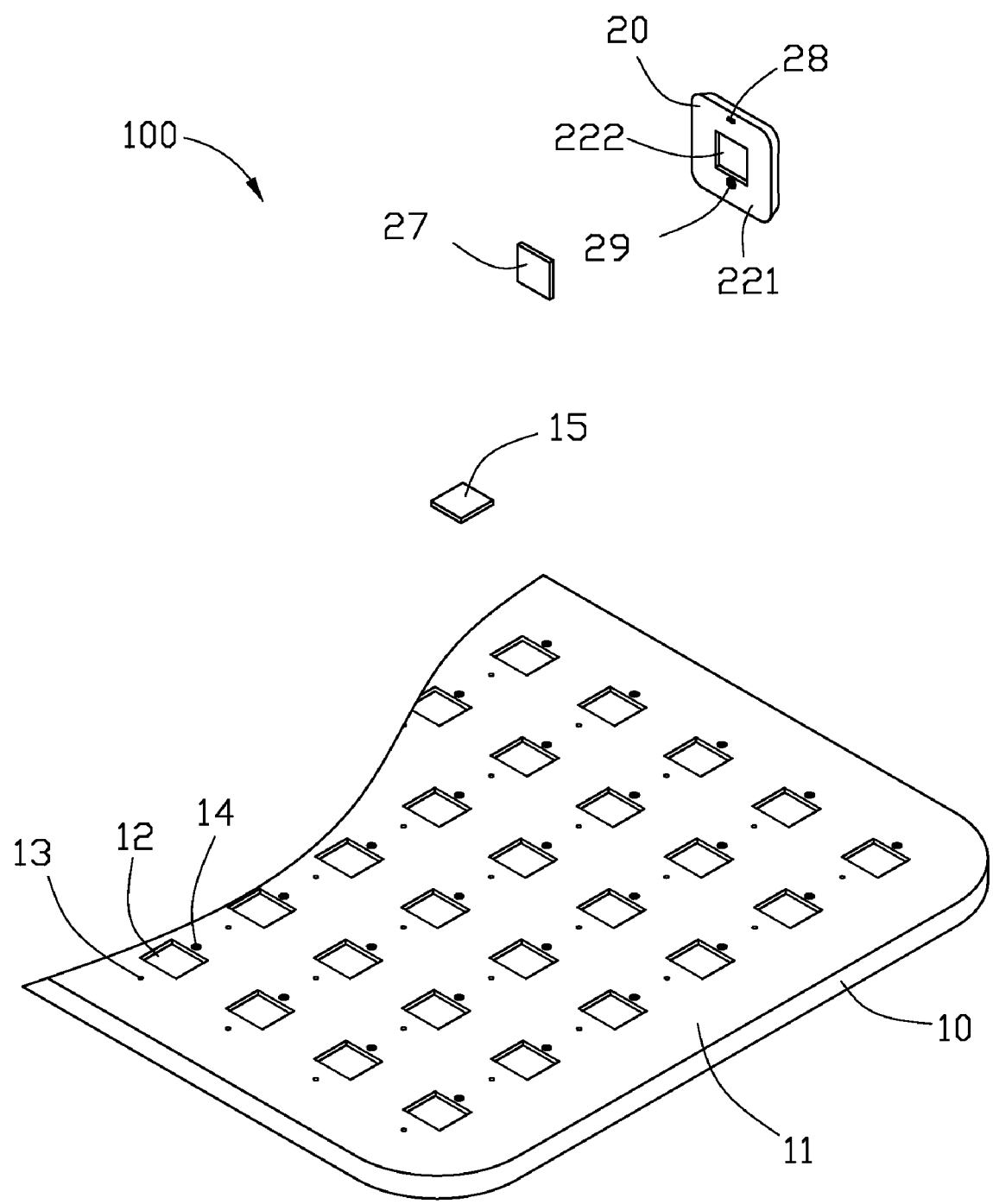
FIG. 2 is an isometric, exploded view of the keyboard of FIG. 1.
Figure 3:
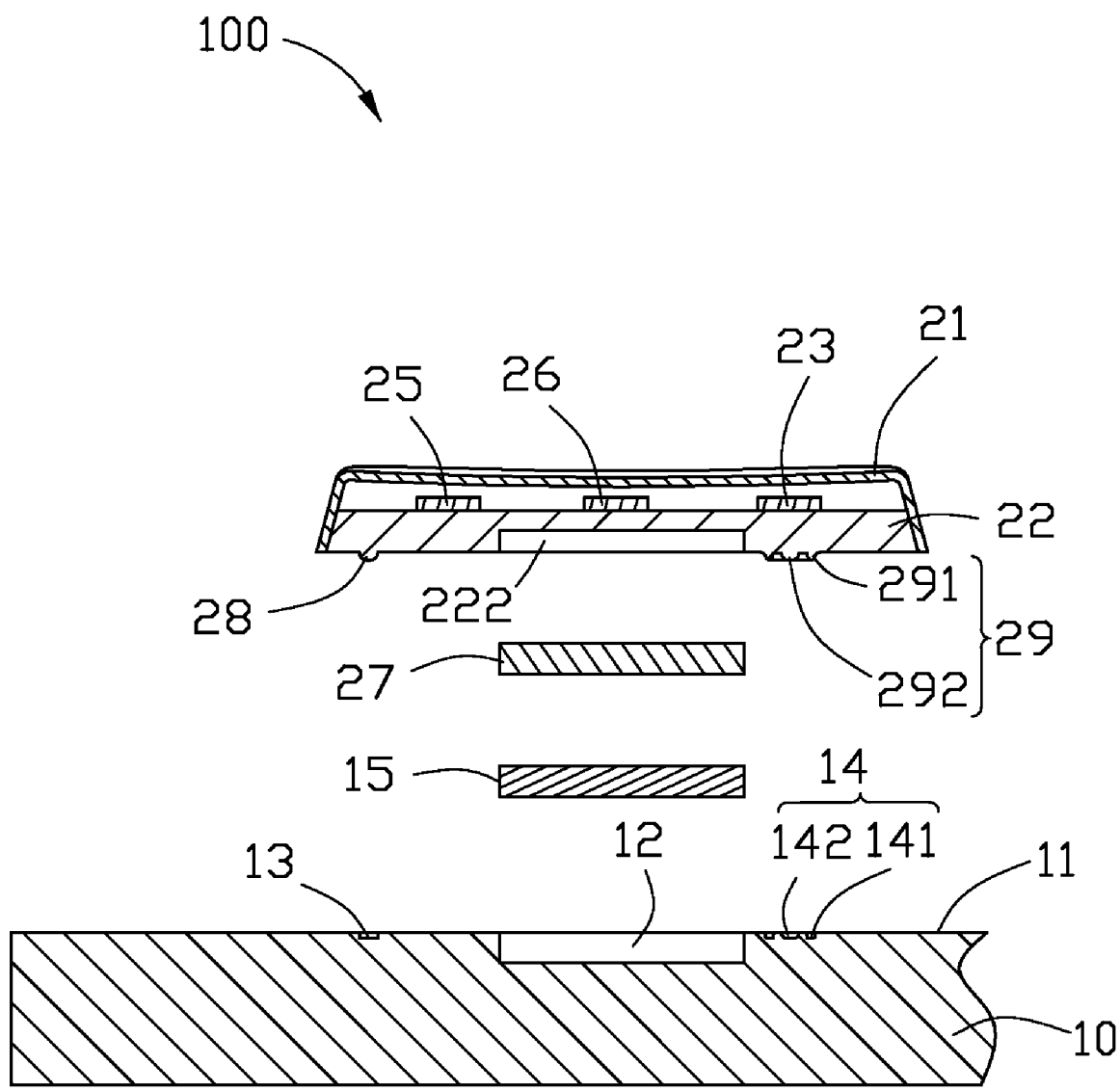
FIG. 3 is an exploded view of a cross-section of the keyboard of FIG. 1 taken along the line III-III.

Referring to FIG. 2 and FIG. 3, corresponding to each input key 20, the panel 10 defines a first receiving space 12 on the surface 11, and includes a first positive contact 13, a first complex contact 14, and a first magnet 15.

The first positive contact 13 and the first complex contact 14 are disposed at opposite sides of the first receiving space 12 correspondingly. The first positive contact 13 and the first complex contact 14 are all made of metal. The first complex contact 14 includes a first signal contact 141 and a first negative contact 142. The first signal contact 141 is ring-shaped, and the first negative contact 142 is located in the center of the first signal contact 141. The first magnet 15 is received in the first receiving space 12. It is understood that, in another embodiment, a number of the first receiving spaces 12 are defined in a matrix manner communicating with each other. A number of the first positive contacts 13 arranged in a matrix manner corresponding to the first receiving spaces 12 are connected to each other. And a number of first magnets 15 arranged in a matrix manner corresponding to the first receiving spaces 12 are integrally formed.

Figure 4:
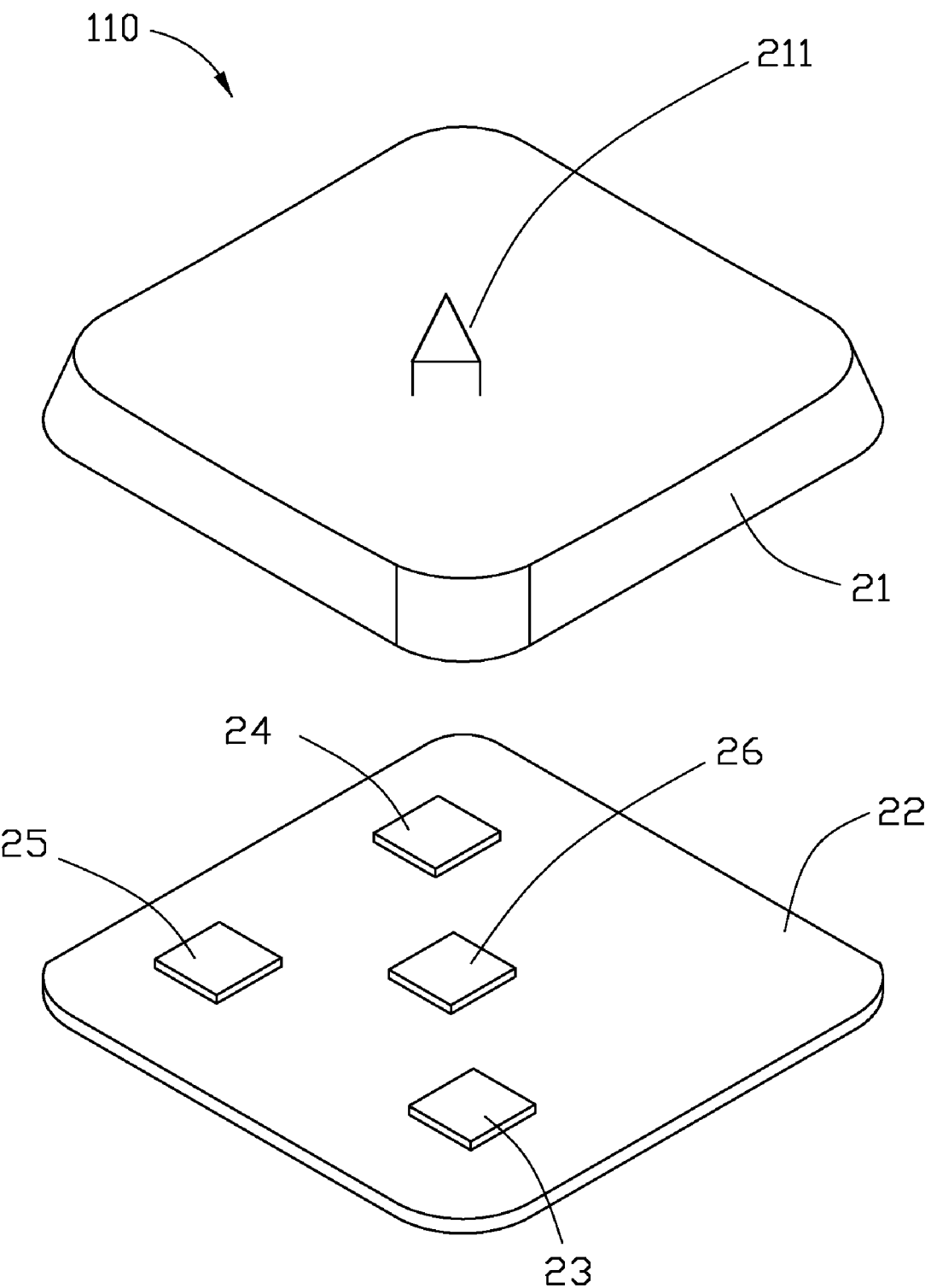
FIG. 4 is an isometric, exploded view of the input key of the keyboard of FIG. 1.

Referring to FIGS. 2-4, the input key 20 includes a top wall 21, a bottom wall 22, a signal transmitter 23, a first signal lamp 24, a second signal lamp 25, a trigger switch 26, a second magnet 27, a second positive contact 28, and a second complex contact 29.

The top wall 21 is made of elastic material, and includes a character symbol portion 211 formed thereon. Either of the character symbol portion 211 or the other portion of the top wall 21 is made of transparent material. In the present embodiment, the character symbol portion 211 is made of transparent material, and the other portion of the top wall 21 is made of opaque material.

The bottom wall 22 includes a bottom surface 221 facing the panel 10, and defines a second receiving space 222 on the bottom surface 221.

The second magnet 27 is received in the second receiving space 222 for attracting the first magnet 15, therefore, the input key 20 can be fixed on the panel 10. The input key 20 can be easily removed from the panel 10 by applying a pulling force on the input key 20 that is greater than the attractive force between the second magnet 27 and the first magnet 15.

The second positive contact 28 and the second complex contact 29 are disposed at opposite sides of the second receiving space 222 correspondingly. The second positive contact 28 is configured for connecting to the first positive contact 13. The second complex contact 29 is configured for connecting to the first complex contact 14. The second positive contact 28 and the second complex contact 29 are made of metal. The second complex contact 29 includes a second signal contact 291 and a second negative contact 292 corresponding to the first signal contact 141 and the first negative contact 142 respectively. The second signal contact 291 is ring-shaped, and the second negative contact 292 is located in the center of the second signal contact 291.

The signal transmitter 23, the first signal lamp 24, the second signal lamp 25, and the trigger switch 26 are disposed between the top wall 21 and the bottom wall 22. The trigger switch 26 is disposed on the center of a surface of the bottom wall 22 facing the top wall 21. The signal transmitter 23 can emit a signal reflecting the function of the input key 20. Because the signal transmitter 23 is received in the input key 20, the function of the input key 20 is determined by the signal transmitter 23 received in the input key 20, and not dependent on the position of the input key 20 assembled on the panel 10. Therefore, the input key 20 with a predetermined function can be assembled at any position of the panel 10 as required. That is the keyboard 100 is rearrangeable. The color of the first signal lamp 24 and the second signal lamp 25 are different. In the present embodiment, the first signal lamp 24 is a green light-emitting diode, the second signal lamp 25 is a red light-emitting diode. The trigger switch 26 is used for controlling the first signal lamp 24 and the second signal lamp 25 on or off, and controlling the signal transmitter 23 to emit signal or not.

The first signal lamp 24 is used for prompting whether the input key 20 is properly assembled on the panel 10, and the second signal lamp 25 is used for prompting whether the input key 20 is pressed or not. When the input key 20 is properly assembled on the panel 10, the first signal lamp 24 is on. When the input key 20 is pressed after being properly assembled, the first signal lamp 24 will be off, and the second signal lamp 25 will be on, and the signal transmitter 23 will emit a signal reflecting the function of the input key 20.

Figure 5:
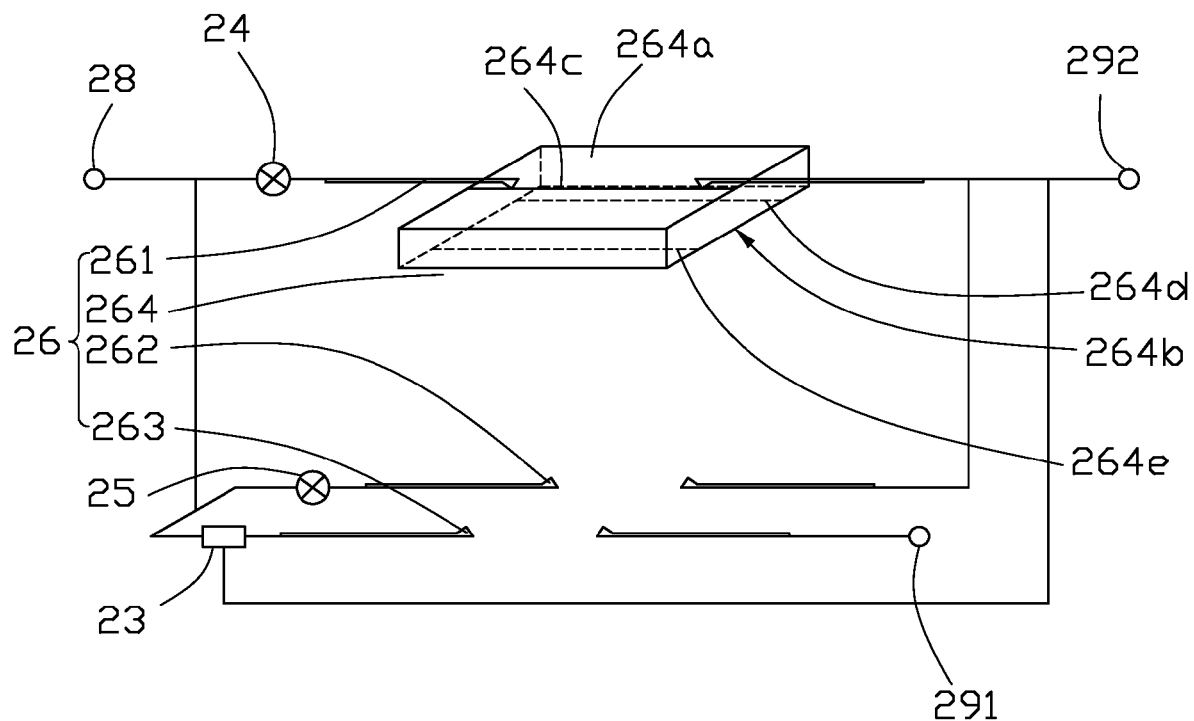
FIG. 5 is a circuit diagram of the keyboard of FIG. 1.

Further referring to FIG. 5, in the present embodiment, the trigger switch 26 includes a first switch 261, a second switch 262, a third switch 263 and an insulating sheet 264 which can be moved upwards and downwards by releasing or pressing the top wall 21 correspondingly. The insulating sheet 264 includes a first surface 264a and an opposite second surface 264b. The first surface 264a faces the top wall 21 of the input key 20. The second surface 264b faces to the bottom wall 22 of the input key 20. The first switch 261 is disposed on a side of the first surface 264a. The second switch 262 and the third switch 263 are parallelly disposed on a side of the second surface 264b. A first wire 264c is mounted on the first surface 264a and configured for conducting the first switch 261. A second wire 264d and a third wire 264e are parallelly mounted on the second surface 264b and configured for conducting the second switch 262 and the third switch 263 respectively.

The first signal lamp 24 and the first switch 261 are electrically connected in series between the second positive contact 28 and the second negative contact 292. The second signal lamp 25 and the second switch 262 are electrically connected in series between the second positive contact 28 and the second negative contact 292. The signal transmitter 23 includes three contact points. Two contact points are electrically connected to the second positive contact 28 and the second negative contact 292 correspondingly. The other contact point is electrically connected to the second signal contact 291 via the third switch 263.

When the input key 20 is properly assembled and not pressed, the insulating sheet 264 is contacted with the first switch 261 to make the first switch 261 conduct, and the first signal lamp 24 is on. When the input key 20 is pressed after properly assembled, the insulating sheet 264 moves downwards to separate from the first switch 261 and contacts with the second switch 262 and the third switch 263, the first signal lamp 24 will be off, the second signal lamp 25 is on, and the signal transmitter 23 will emit a signal corresponding to the function of the input key 20.

Figure 6:
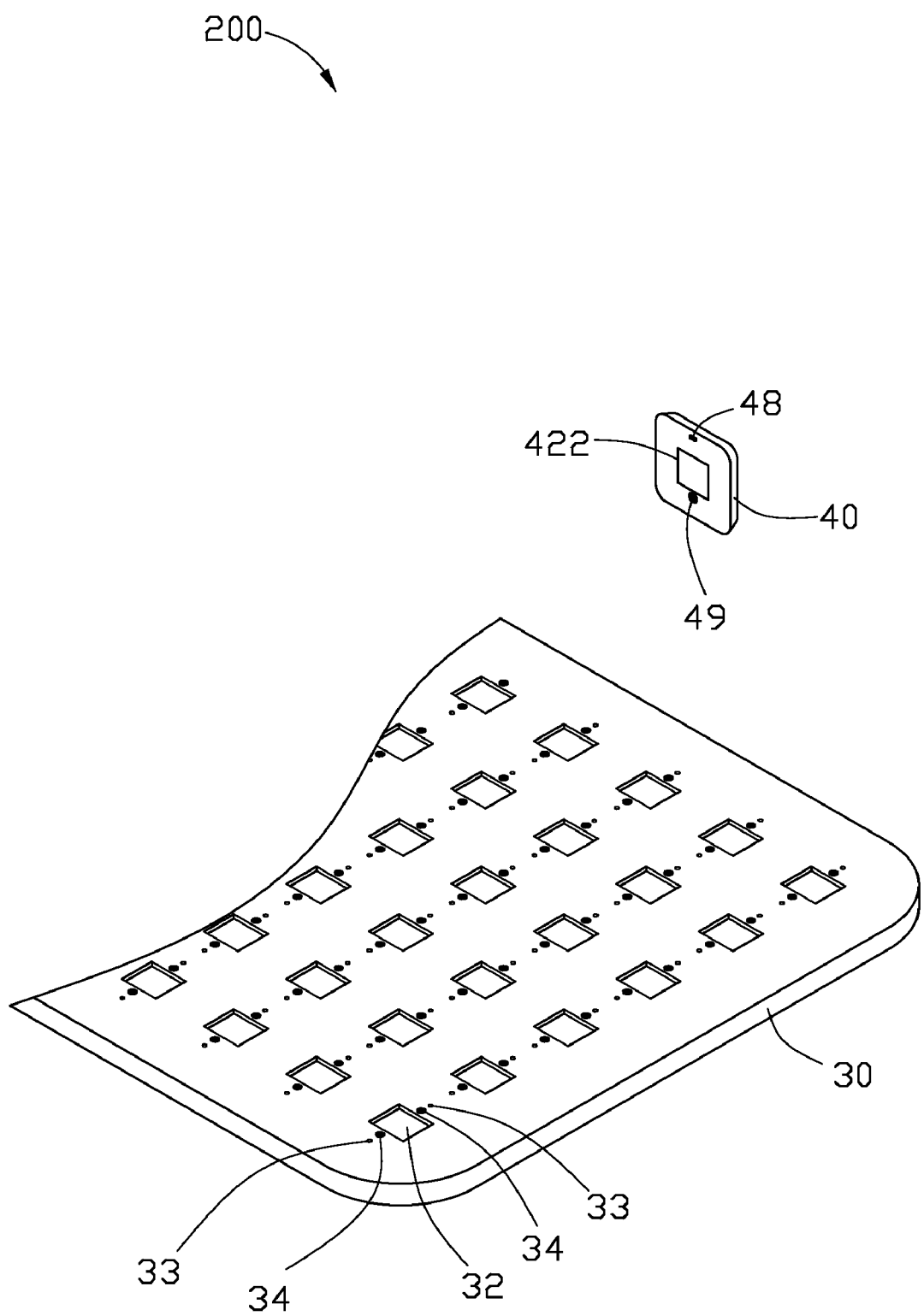
FIG. 6 is an isometric, exploded view of a keyboard according to a second exemplary embodiment.
Figure 7:
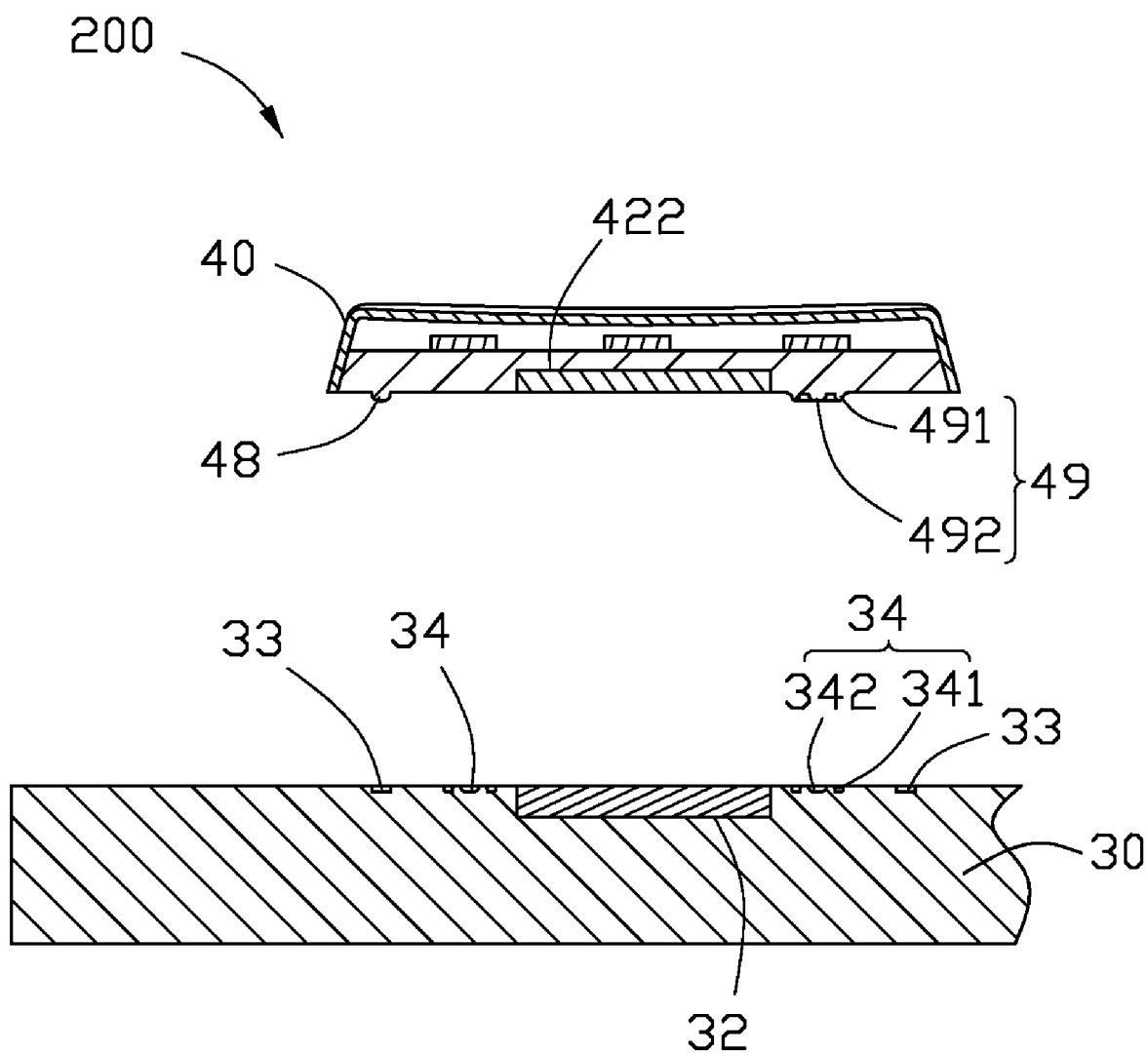
FIG. 7 is a cross-sectional and exploded view of the keyboard of FIG. 6.

Referring to FIG. 6 and FIG. 7, a keyboard 200 according to a second exemplary embodiment is shown. The keyboard 200 includes a panel 30 and a number of input keys 40. Each input key 40 defines a second receiving space 422, and includes a second positive contact 48, and a second complex contact 49. The distance from the second positive contact 48 to the center of the second receiving space 422 is larger than the distance from the second complex contact 49 to the center of the second receiving space 422. The second complex contact 49 includes a second signal contact 491 and a second negative contact 492. Corresponding to each input key 40, the panel 30 defines a first receiving space 32, and includes two first positive contacts 33 and two first complex contacts 34. The first complex contact 34 includes a first signal contact 341 and a first negative contact 342. The two first positive contacts 33 are symmetrically located at opposite sides of the first receiving space 32 correspondingly, and the two first complex contacts 34 are also symmetrically located at opposite sides of the first receiving space 32 correspondingly and aligned with the two first positive contacts 33. The distance between the two first positive contacts 33 is larger than the distance between the two first complex contacts 34. Such that, the two first positive contacts 33 and the two first complex contacts 34 form two pairs of contacts assembly. Each pair of contacts assembly includes a first positive contact 33 and a first complex contact 34 positioned on opposite sides of the first receiving space 32 correspondingly.

In use, the second positive contact 48 and the second complex contact 49 can connect to one pair of contacts assembly. Also, the second positive contact 48 and the second complex contact 49 can connect to another pair of contacts assembly. Therefore, when the input key 40 is mistakenly disposed on the panel 30 or positioned upside down or one pair of contacts are damaged, the keyboard 200 can still work normally.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A keyboard comprising:
a panel; and
a plurality of input keys capable of being assembled on the panel;
wherein the panel comprises at least one first positive contact, at least one first negative contact and at least one first signal contact disposed on the panel; each input key of the plurality of input keys comprising a second positive contact, a second negative contact, a second signal contact and a signal transmitter received therein, the second positive contact, the second negative contact and the second signal contact being configured for connecting to the at least one first positive contact, the at least one first negative contact and the at least one first signal contact respectively when the input key is assembled on the panel; the signal transmitter being configured for emitting a signal reflecting the function of the input key when the input key is pressed.

2. The keyboard as claimed in claim 1, wherein the input key comprises a trigger switch configured for controlling the signal transmitter to emit a signal when the input key is pressed.

3. The keyboard as claimed in claim 1, wherein corresponding to each input key, the panel defines a first receiving space and comprises a first magnet received in the first receiving space, and each input key defines a second receiving space and comprises a second magnet received in the second receiving space for attracting the first magnet.

4. The keyboard as claimed in claim 2, wherein each input key comprises a top wall and a bottom wall, and the top wall is made of elastic material.

5. The keyboard as claimed in claim 4, wherein each input key comprises a character symbol portion formed on the top wall of the input key, and either of the character symbol portion or the other portion of the top wall is made of transparent material.

6. The keyboard as claimed in claim 4, wherein each input key further comprises a first signal lamp configured for prompting whether the input key is properly assembled on the panel and a second signal lamp configured for prompting whether the input key is pressed or not.

7. The keyboard as claimed in claim 6, wherein the trigger switch comprises a first switch, a second switch, a third switch and an insulating sheet configured for moving upwards and downwards by releasing or pressing the input key respectively, the insulating sheet comprises a first surface facing to the top wall and an opposite second surface facing to the bottom wall, the first switch is disposed on a side of the first surface and capable of electrically connecting to the first surface of the insulating sheet, and the second switch and the third switch are parallelly disposed on a side of the second surface and capable of electrically connecting to the second surface of the insulating sheet respectively.

8. The keyboard as claimed in claim 7, wherein the first signal lamp and the first switch are electrically connected in series between the second positive contact and the second negative contact, the second signal lamp and the second switch are electrically connected in series between the second positive contact and the second negative contact, the signal transmitter comprises three contact points, two contact points are electrically connected to the second positive contact and the second negative contact respectively, and the other contact point is electrically connected to the second signal contact via the third switch.

9. The keyboard as claimed in claim 3, wherein the first signal contact is ring-shaped, and the first negative contact is located in the center of the first signal contact.

10. The keyboard as claimed in claim 9, wherein the second signal contact is ring-shaped, and the second negative contact is located in the center of the second signal contact.

11. The keyboard as claimed in claim 3, wherein the panel comprises a plurality of first positive contacts, and the plurality of first positive contacts arranged in a matrix manner corresponding to the first receiving space are connected to each other.

12. The keyboard as claimed in claim 3, wherein the plurality of the first receiving spaces are defined in a matrix manner communicating with each other, and the plurality of first magnets in a matrix manner corresponding to the first receiving spaces are integrally formed.

13. The keyboard as claimed in claim 10, wherein the second positive contact and the second signal contact are positioned on opposite sides of the second receiving space correspondingly, and the distance from the second positive contact to the center of the second receiving space is larger than the distance from the second signal contact to the center of the second receiving space.

14. The keyboard as claimed in claim 3, wherein corresponding to each input key, the panel comprises two first positive contacts, two first negative contacts and two first signal contacts, the two first positive contacts are symmetrically located at opposite sides of the first receiving space correspondingly, the two first negative contacts are symmetrically located at opposite sides of the first receiving space correspondingly, and the two first signal contacts are symmetrically located at opposite sides of the first receiving space correspondingly.

* * * * *